Patented Apr. 21, 1925.

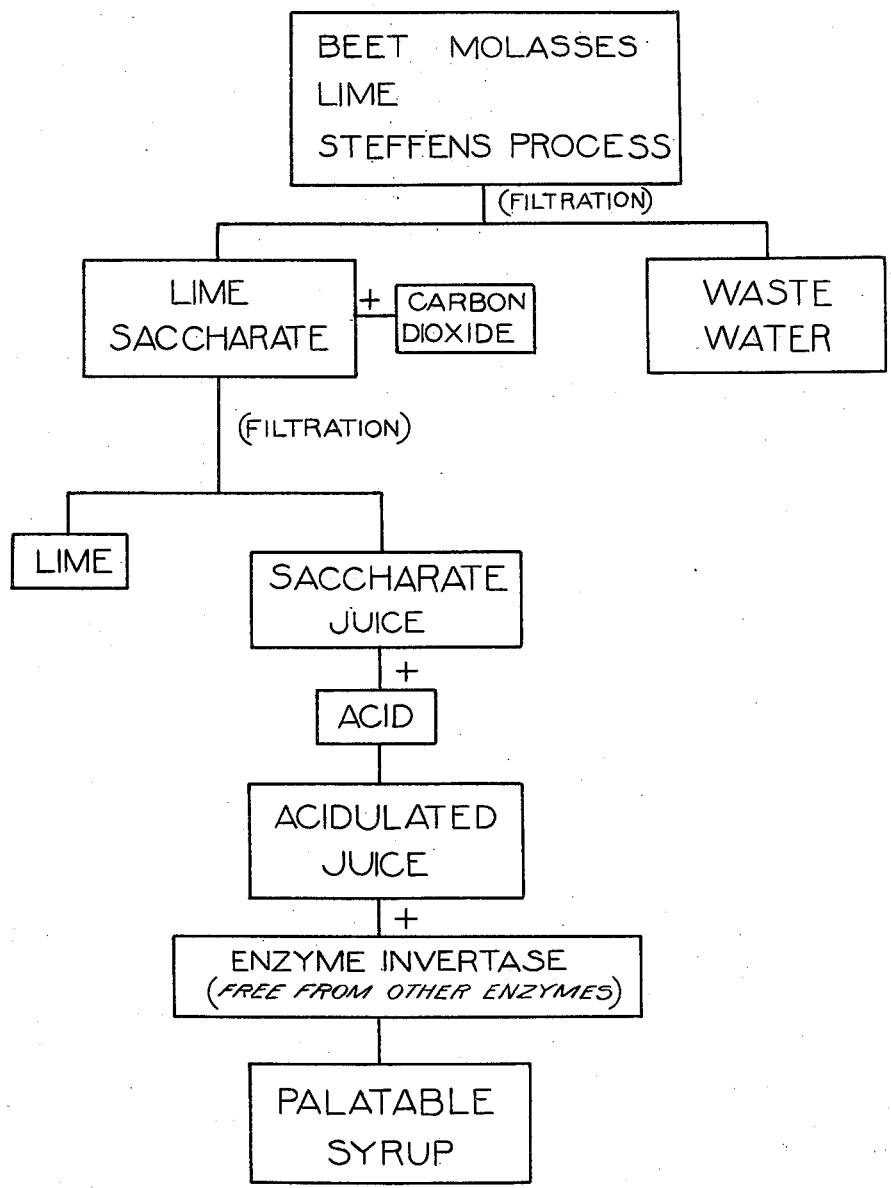

1,534,166

UNITED STATES PATENT OFFICE.

HENRY W. DAHLBERG, OF DENVER, COLORADO, ASSIGNOR TO THE GREAT WESTERN SUGAR COMPANY, OF DENVER, COLORADO, A CORPORATION OF NEW JERSEY.

PALATABLE BEET SIRUP AND PROCESS OF PREPARING THE SAME.

Application filed February 29, 1924. Serial No. 696,005.

*To all whom it may concern:*

Be it known that I, HENRY W. DAHLBERG, a citizen of the United States, residing at Denver, in the county of Denver and State of Colorado, have invented new and useful Improvements in a Palatable Beet Sirup and Process of Preparing the Same, of which the following is a specification.

This invention relates to the production of palatable sirups from beet materials, particularly from beet molasses, and provides a product and process of making the same by treating beet molasses.

Beet molasses is a dark sirup which is unfit for human consumption, and which is bitter and highly laxative. Accordingly, beet materials have not been used as sirups. The present invention provides for the production from beet molasses of an edible and delicious sirup of high purity, which is suitable for table use, for candy manufacture, for canning either alone or with foods, or for blending with other sirups. The process makes it possible to obtain at comparatively low cost from beet molasses, now a relatively low grade material, a new product having substantial commercial value. This result is obtained by the treatment with a relatively pure preparation of enzyme invertase, substantially free from other sucrose attacking enzymes, of the saccharate juice from a certain stage of the Steffens process. This preparation is now to be obtained as a standardized product. Yeast and other known ferments will not provide the same palatable resultant sirup.

Commercial "invertase" is now used by candy and sirup manufacturers in fondants and sirups to prevent crystallization. It may be purchased at about $4.00 per pound. As used in the present invention a given weight of invertase is usually sufficient to treat several hundred times the same weight of beet molasses.

The detailed steps of the process will now be explained. The accompanying drawing illustrates diagrammatically the sequence of the steps and the materials treated. Referring in detail to the drawing, beet molasses is initially treated with lime at a low temperature, preferably between 0° C. and 20° C., by the well known Steffens process, according to the description thereof presented in this specification, to produce a lime saccharate, which latter is separated by filtration from the waste water. The Steffens process thus provides for the precipitation of sugar from a cold dilute molasses solution by means of powdered lime. Then the lime saccharate is treated with carbon dioxide gas (carbonic acid gas) to remove the lime and leave the sugar juice (saccharate juice) which has an unpleasant, unpalatable flavor. The resultant materials are filtered. Thus far the steps of the process are old as the known Steffens process. The subsequent treatment includes the steps of the present improvement which is directed to the treatment of the saccharate juice of the Steffens process. The saccharate juice is then treated with sufficient of an organic acid, such as acetic acid, to neutralize any alkalinity of the juice, which alkalinity may be naturally resultant of the Steffens process treatment. Only sufficient acid need be used to slightly acidify the juice, as will be further explained. Less than one per cent of acetic acid to the weight of sugar present in the juice need be used. As substitutes for acetic acid, other organic acids may be used, such as tartaric or citric acids.

After receiving the foregoing preliminary novel acidifying treatment, the mixture is subjected to an inverting treatment in accordance with the following explanation. The enzyme invertase, standardized, and in substantially pure form and substantially free from other enzymes and sucrose attacking material, is added to the acidified juice for the purpose of inverting approximately 65 per cent of the sugar content of the juice. This is done to secure the desired improved flavor. During the inversion treatment, a temperature must be maintained less than 60° C., else the invertase will be destroyed. The enzyme acts better in a slightly acid juice than in an alkaline juice.

As result of the foregoing treatment, a bitter material is converted into a palatable, edible sirup. Just what happens to effect the change in flavor is largely problematical. It is probable that the disagreeable flavor is at least in part due to the presence of minute quantities of organic nitrogenous matter which is either destroyed or converted by the action of the enzymes. The invention is not predicated on this theory, but is based on the fact that the sirup is made palatable by the treatment described. The molasses, which contains approximately 40 parts of impurities and 60 parts of total sugar in 100 parts of dry substance, has been changed by the Steffens process treatment to a sirup, containing as low as approximately 8 parts of non-sugars and approximately 92 parts of total sugars in 100 parts of dry material, and having a palatable flavor as result of the enzyme treatment. In the course of the treatment, the amount of sucrose partially inverted may vary from 10 per cent to 75 per cent.

The resultant juice is of high purity, contains a high percentage of invert sugar, and has a delicious flavor. The final step of the process is the evaporation of the juice to the desired density, which may be conducted to the degree necessary for adapting the sirup for packaging or for immediate use.

The Bureau of Chemistry of the United States Department of Agriculture has been instrumental in bringing about the standardization of the relatively pure concentrated invertase preparation. The adaptation of such an invertase preparation for partial inversion of sucrose in a sucrose containing solution is described in Patent 1,465,459, to Walton, issued August 21, 1923. I have discovered that the same invertase preparation effects the unexpected result of rendering palatable a previously highly unpalatable sirup, the explanation for which result is as yet not entirely certain.

This application is a continuation in part of my application Serial No. 609,172, filed December 27, 1922.

The expression "Steffens process" is to be understood as that described in this specification and in the claims as the particular steps for the treatment of cold dilute beet molasses with lime.

What I claim is:

1. The process of preparing a palatable sirup from beet molasses which has an unpleasant flavor, which process comprises treating beet molasses with lime to form lime saccharate and waste water, treating the lime saccharate with carbon dioxide to form a lime precipitate and a saccharate juice which is unpalatable, acidifying the saccharate juice, and treating the resultant acidulated mixture with the enzyme invertase substantially free from other sucrose attacking enzymes, and thus rendering the mixture palatable.

2. The process of preparing a palatable sirup from beet molasses which has an unpleasant flavor, which process comprises treating beet molasses with lime to form lime saccharate and waste water, treating the lime saccharate with carbon dioxide to form a lime precipitate and a saccharate juice which is unpalatable, adding an organic acid to the saccharate juice, and treating the resultant acidulated mixture with the enzyme invertase substantially free from other sucrose attacking enzymes, and thus rendering the mixture palatable.

3. The process of preparing a palatable sirup from beet molasses which has an unpleasant flavor, which process comprises treating beet molasses with lime to form lime saccharate and waste water, separating the lime saccharate from the waste water, treating the lime saccharate with carbon dioxide to form a lime precipitate and a saccharate juice which is unpalatable, separating the lime precipitate and the saccharate juice, acidifying the saccharate juice, and treating the resultant acidulated mixture with the enzyme invertase substantially free from other sucrose attacking enzymes, and thus rendering the mixture palatable.

4. The process of preparing a palatable sirup from beet molasses which has an unpleasant flavor, which process comprises treating beet molasses with lime to form lime saccharate and waste water, separating the lime saccharate from the waste water, treating the lime saccharate with carbon dioxide to form a lime precipitate and a saccharate juice which is unpalatable, separating the lime precipitate and the saccharate juice, acidifying the saccharate juice with an organic acid, and treating the resultant acidulated mixture with the enzyme invertase substantially free from other sucrose attacking enzymes, and thus rendering the mixture palatable.

5. The process of preparing a palatable sirup from beet molasses which has an unpleasant flavor, which process comprises treating beet molasses with lime to form lime saccharate and waste water, separating the lime saccharate from the waste water, treating the lime saccharate with carbon dioxide to form a lime precipitate and a saccharate juice which is unpalatable, separating the lime precipitate and the saccharate juice, neutralizing the alkalinity of the saccharate juice by the addition of an organic acid, and treating the resultant mixture with the enzyme invertase substantially free from other sucrose attacking enzymes, and thus rendering the mixture palatable.

6. The process of preparing a palatable sirup from beet molasses which has an unpleasant flavor, which process comprises treating beet molasses with lime to form lime saccharate and waste water, separating the lime saccharate from the waste water, treating the lime saccharate with carbon dioxide to form a lime precipitate and a saccharate juice which is unpalatable, separating the lime precipitate and the saccharate juice, neutralizing the alkalinity of the saccharate juice by the addition of an organic acid amounting up to one per cent by weight of the sugar present, and treating the resultant mixture with the enzyme invertase substantially free from other sucrose attacking enzymes, and thus rendering the mixture palatable.

7. The process of preparing a palatable sirup from beet molasses which has an unpleasant flavor, which process comprises treating beet molasses with lime to form lime saccharate and waste water, treating the lime saccharate with carbon dioxide to form a lime precipitate and a saccharate juice which is unpalatable, acidifying the saccharate juice with acetic acid, and treating the resultant acidulated mixture with the enzyme invertase substantially free from other sucrose attacking enzymes, and thus rendering the mixture palatable.

8. The process of preparing a palatable sirup from beet molasses which has an unpleasant flavor, which process comprises treating beet molasses in accordance with the Steffens process to effect the precipitation of a lime precipitate and the production of a saccharate juice which is unpalatable by treating a cold dilute molasses solution by means of powdered lime, treating the unpalatable saccharate juices resultant of that process to slightly acidify such juices, and rendering the acidified unpalatable material palatable by treating it with invertase substantially free from other sucrose attacking material.

9. The process of preparing a palatable sirup from beet molasses which has an unpleasant flavor, which process comprises treating beet molasses in accordance with the Steffens process to effect the precipitation of a lime precipitate and the production of a saccharate juice which is unpalatable by treating a cold dilute molasses solution by means of powdered lime, treating the unpalatable saccharate juices resultant of that process to slightly acidify such juices, and rendering the acidified unpalatable material palatable by treating it with invertase substantially free from other sucrose attacking material at a temperature below 60° C.

10. The process of preparing a palatable sirup from beet molasses which has an unpleasant flavor, which process comprises treating beet molasses in accordance with the Steffens process to effect the precipitation of a lime precipitate and the production of a saccharate juice which is unpalatable by treating a cold dilute molasses solution by means of powdered lime, treating the unpalatable saccharate juices resultant of that process to slightly acidify such juices, and inverting a portion of the sugar content of the acidified unpalatable material by adding invertase substantially free from other sucrose attacking material, whereby the flavor of the material is improved and made palatable.

11. The process of preparing a palatable sirup from beet molasses which has an unpleasant flavor, which process comprises treating beet molasses in accordance with the Steffens process to effect the precipitation of a lime precipitate and the production of a saccharate juice which is unpalatable by treating a cold dilute molasses solution by means of powdered lime, treating the unpalatable saccharate juices resultant of that process to slightly acidify such juices, rendering the acidified unpalatable material palatable by treating it with invertase substantially free from other sucrose attacking material, and evaporating the resultant palatable sirup to the desired density.

12. The process of preparing a palatable sirup from beet molasses which has an unpleasant flavor, which process comprises treating beet molasses in accordance with the Steffens process to effect the precipitation of a lime precipitate and the production of a saccharate juice which is unpalatable by treating a cold dilute molasses solution by means of powdered lime, treating the unpalatable saccharate juices resultant of that process to slightly acidify such juices, rendering the acidified unpalatable material palatable by treating it with invertase substantially free from other sucrose attacking material at a temperature below 60° C., and evaporating the resultant palatable sirup to the desired density.

13. The process of preparing a palatable sirup from beet molasses which has an unpleasant flavor, which process comprises treating beet molasses in accordance with the Steffens process to effect the precipitation of a lime precipitate and the production of a saccharate juice which is unpalatable by treating a cold dilute molasses solution by means of powdered lime, treating the unpalatable saccharate juices resultant of that process to slightly acidify such juices, inverting a portion of the sugar content of the acidified unpalatable material by adding invertase substantially free from other sucrose attacking material, whereby the flavor of the material is improved and made palatable and evaporating the resultant palatable sirup to the desired density.

14. The process of rendering palatable the unpalatable beet liquids produced during the manufacture of beet sugar, which process includes the treatment of the unpalatable liquids to be changed by adding a commercial preparation of enzyme invertase substantially free from other sucrose attacking enzymes, and thus rendering the liquid palatable.

15. The process of rendering palatable the unpalatable beet liquids produced during the manufacture of beet sugar, which process includes the treatment of the unpalatable liquids to be changed by adding to a slightly acidulated mixture of the liquid to be treated the enzyme invertase substantially free from other sucrose attacking enzymes, and thus rendering the liquid palatable.

16. The palatable liquid product resultant from treating unpalatable beet saccharate juice, produced by the Steffens process in which a cold dilute molasses solution is treated with powdered lime, with acid to counteract any alkalinity and with the enzyme invertase substantially free from other sucrose attacking enzymes to improve the flavor.

17. The palatable beet liquid resultant of treating an unpalatable beet liquid containing sugar with the enzyme invertase substantially free from other sucrose attacking enzymes.

18. The palatable beet liquid resultant of treating an unpalatable beet saccharate juice with the enzyme invertase substantially free from other sucrose attacking enzymes.

19. The process of rendering palatable the unpalatable beet sirups formed during the process of beet sugar manufacture, which process includes the treatment of the unpalatable liquids to be changed and remaining after the cold dilute treatment of beet sugar solutions with lime by adding commercial invertase, and thus rendering the liquid palatable.

20. The process of rendering palatable the unpalatable beet sirups formed during the process of beet sugar manufacture, which process includes the treatment of the unpalatable liquids to be changed by adding commercial invertase, and thus rendering the liquid palatable.

In testimony whereof I affix my signature.

HENRY W. DAHLBERG.